UNITED STATES PATENT OFFICE.

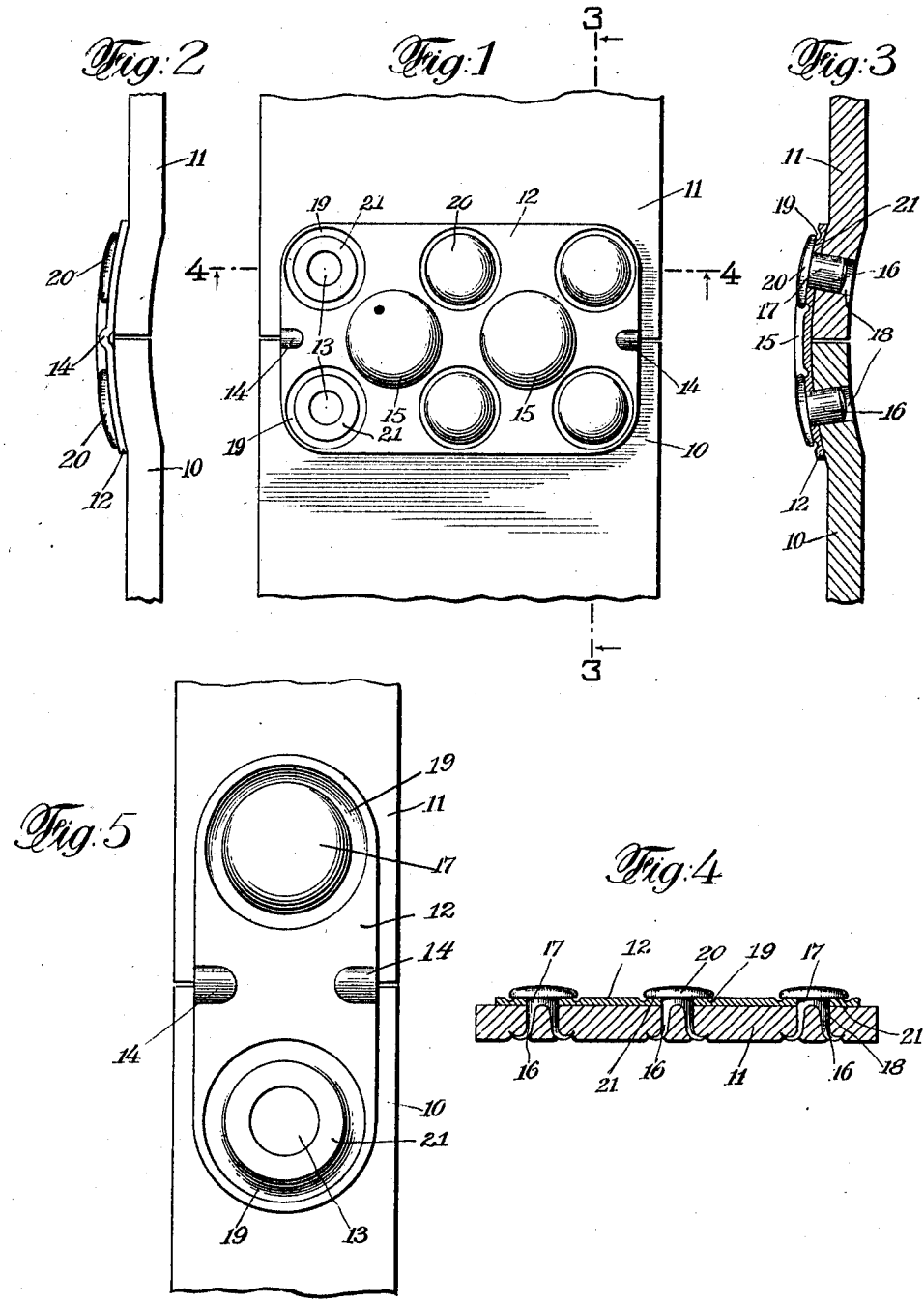

WILLIAM H. BRISTOL, OF WATERBURY, CONNECTICUT.

BELT-FASTENER.

1,004,356. Specification of Letters Patent. Patented Sept. 26, 1911.

Application filed December 24, 1910. Serial No. 599,217.

*To all whom it may concern:*

Be it known that I, WILLIAM H. BRISTOL, a citizen of the United States, and a resident of River Road, Waterbury, in the county of New Haven and State of Connecticut, have invented certain new and useful Improvements in Belt-Fasteners, of which the following is a specification.

My invention relates to belt fasteners for joining the abutting ends of power transmitting belts, and particularly to belt fasteners employing suitable rivets adapted to pass through perforations provided therefor in the fastener and through the said abutting belt ends.

It has for its object to provide a fastener of this character and in which the aforesaid rivets may be driven home to securely join the ends of the belt.

It has for its further object to provide a fastener which may be applied with precision and rapidity, and from which the aforesaid rivets may be readily withdrawn for the purpose of removing the fastener when occasion requires.

To this end the invention consists of certain details of construction hereinafter more fully described, and set forth in the accompanying drawings, in which—

Figure 1 is a plan view of a belt joint made with my improved fastener. Fig. 2 is an end view of the same. Fig. 3 is a section taken on the line 3—3, Fig. 1. Fig. 4 is a section taken on the line 4—4, Fig. 1. Fig. 5 is a plan view illustrating a fastener for belts of narrow width and made in accordance with my invention.

Similar characters of reference designate corresponding parts throughout the several views.

Referring now to the drawing, 10 and 11 designate abutting belt ends which are to be fastened together by means of my improved fastener. This fastener consists essentially of a plate 12 preferably rectangular and having rounded corners, said plate being composed of thin metal suitable for the purpose. Perforations 13 are provided therein and are oppositely disposed with respect to the transverse center line of said plate. This center line may be conveniently marked by embossed portions 14 projecting at each end slightly above the upper surface of the plate 12, whereby the said plate may be properly located upon a line of abutment of the belt ends in applying the fastener. These embossed portions serve also to strengthen the plate; and I prefer, furthermore, to provide other embossed portions 15 extending slightly above the upper surface of plate 12 and located intermediate of the perforations 13, Fig. 1. These additional embossed portions stiffen the plate as a whole, and materially aid the said plate to withstand the tendency to bend and again straighten in passing about a pulley or the like. It is of course to be understood that these embossed portions may be located at points other than shown, and that the form of the same may likewise be altered; or, may in some cases be entirely omitted, as shown in Fig. 5.

Immediately surrounding each perforation 13, and thus the shank 16 of the rivets 17, which rivets are adapted to pass through the said perforations as well as through holes 18 in the belt ends, are annular depressions 19. These depressions are formed by swaging the metal to a suitable depth and are preferably arranged to come slightly under the head 20 of the rivets 17, thus leaving an annular bearing shoulder 21 for the effective holding portion of the rivet head. The depressions thus formed do not alter the smooth under surface of the fastener, permitting thereby the rivets to most securely bind the portion of the under surface immediately surrounding the rivets to the surface of the belt. The annular recesses 19, furthermore, afford sufficient room for the insertion of a suitable tool whereby the said rivets may be removed when occasion requires. The rivets themselves, as shown, are of the bifurcated type with the curl of the points transverse to the belt. I do not wish, however, to restrict myself to any particular style of rivet. The annular depressions, in addition to their permitting of the ready insertion of a tool for the removal of the same, materially strengthen the portion of the plate 12 immediately surrounding the shank of the rivets, owing to the compression of the metal by the swaging. Furthermore, by providing a depression as set forth, the portion of the plate immediately surrounding the rivets does not project above the upper surface of said plate; and the rivets, may, therefore, be driven home and do not project more than absolutely necessary above the upper surface of the belt.

I claim:—

1. A belt fastener consisting of a thin plate of metal provided with perforations, and with annular grooves in the upper surface and surrounding the top of said perforations, and suitable rivets adapted to fit said perforations and having heads of a diameter sufficient to overlie said grooves in part, as and for the purpose set forth.

2. A belt fastener consisting of a thin plate of metal provided with perforations, and with annular, swaged grooves in the upper surface and surrounding said perforations, and annular shoulders lying in the upper surface of said plate between the said perforations and said annular grooves, and suitable rivets adapted to fit said perforations and their head to rest upon said shoulders and the said heads being of a diameter sufficient to overlie said grooves in part, as and for the purpose set forth.

Signed at New York, in the county of New York, and State of New York, this 22nd day of December A. D. 1910.

WILLIAM H. BRISTOL.

Witnesses:
JEANNETTE STORK,
FREDK. F. SCHUETZ.

Copies of this patent may be obtained for five cents each, by addressing the "Commissioner of Patents, Washington, D. C."